(12) United States Patent
Earnest

(10) Patent No.: US 7,191,166 B2
(45) Date of Patent: Mar. 13, 2007

(54) METHOD AND SYSTEM FOR COMPARING INFORMATION CONTENTS

(75) Inventor: Jerry Brett Earnest, San Francisco, CA (US)

(73) Assignee: Wells Fargo Bank N.A., San Francisco, CA (US)

( * ) Notice: Subject to any disclaimer, the term of this patent is extended or adjusted under 35 U.S.C. 154(b) by 486 days.

(21) Appl. No.: 10/085,836

(22) Filed: Feb. 27, 2002

(65) Prior Publication Data

US 2003/0163491 A1    Aug. 28, 2003

(51) Int. Cl.
    *G06F 17/30* (2006.01)
(52) U.S. Cl. .............................. 707/1; 707/7
(58) Field of Classification Search ............ 707/1, 707/7, 10, 100, 102, 201; 715/500.1, 514; 709/200
    See application file for complete search history.

(56) References Cited

U.S. PATENT DOCUMENTS

| | | | |
|---|---|---|---|
| 5,638,446 A | 6/1997 | Rubin | |
| 5,684,951 A | 11/1997 | Goldman et al. | |
| 5,745,574 A | 4/1998 | Muftic | |
| 5,826,022 A | 10/1998 | Nielsen | |
| 5,859,967 A | 1/1999 | Kaufeld et al. | |
| 5,892,904 A | 4/1999 | Atkinson et al. | |
| 5,905,863 A | 5/1999 | Knowles et al. | |
| 5,918,014 A | 6/1999 | Robinson | |
| 5,996,076 A | 11/1999 | Rowney et al. | |
| 5,999,967 A | 12/1999 | Sundsted | |
| 6,052,709 A | 4/2000 | Paul | |
| 6,085,321 A | 7/2000 | Gibbs et al. | |
| 6,115,709 A | 9/2000 | Gilmour et al. | |
| 6,128,655 A | 10/2000 | Fields et al. | |
| 6,138,158 A | 10/2000 | Boyle et al. | |
| 6,154,783 A | 11/2000 | Gilmour et al. | |
| 6,182,219 B1 | 1/2001 | Feldbau et al. | |
| 6,185,551 B1 | 2/2001 | Birrell et al. | |
| 2003/0069803 A1* | 4/2003 | Pollitt ......................... | 705/26 |
| 2004/0049446 A1* | 3/2004 | Seljeseth ..................... | 705/37 |
| 2005/0043060 A1* | 2/2005 | Brandenberg et al. ....... | 455/558 |

FOREIGN PATENT DOCUMENTS

| | | |
|---|---|---|
| EP | 946 022 | 9/1999 |
| EP | 964 542 | 12/1999 |
| GB | 2 343 529 | 5/2000 |

OTHER PUBLICATIONS

*Tools That Help You Can SPAM*; Chae Lee; Network; Nov. 1998.
*SPAM- New Easy to Use Tool Intelligently Identifies and Filters Unwanted Junk Email*; EDGE: Work-Group Computing Report; v8, p. 11; Dec. 15, 1997.

(Continued)

*Primary Examiner*—Alford W. Kindred
(74) *Attorney, Agent, or Firm*—Michael A. Glenn; Glenn Patent Group

(57) ABSTRACT

The method and system disclosed herein provide for detecting duplicate information contents such as emails, before storing them in the system, in a fast and reliable way. A parameter that uniquely represents each information content may be determined, and the comparison process of the information contents may be efficiently carried out on the parameters, rather than on the actual information contents.

14 Claims, 2 Drawing Sheets

OTHER PUBLICATIONS

*For Best Results, Can the Spam Yourself*; Scott Spanbauer; PC world; Jan. 2001.
*When Marketing Becomes Spam*; Sam Michel; New Media Age; Nov. 30, 2000.
*AOL Puts Spam Policy in Users' Hands*; Danny Bradbury; Computer Weekly; Dec. 2, 1999.
*AT&T WorldNet Service Deploys Brightmail Anti-Spam Service; ISP Leader Begins 'No-Tolerance' Campaign Against Spam*; Cambridge Telecom Report; Sep. 6, 1999.
*VPN: Lucent Adds Leading Anti-Virus and Content Filtering Software to Lucent VPN Gateway and Lucent Managed Firewall*; EDGE: Work-Group Computing Report; Mar. 22, 1999.
*Block Junk Email*; PC/Computing, v11, n11, p. 156; Nov. 1998.
*Eric Allman Outlines New Spam-Defense in Sendmail*; Computergram International; n196, pNA; Oct. 1, 1998.
*E-mail Packages*; Bonny Georgia; Home Office Computing, v16, n6, p89; Jun. 1998.
*Seattle Labs Produce "Spam" Filter*; Computegram International; n3295, Nov. 21, 1997.
*Spam Part 2: Updates, Techniques for Fighting Back*; Ric Ford; MacWEEK; v11, n22, p. 30; Jun. 2, 1997.
*Internet Mail*; Ed Bott; PC/Computing; v10, n1, p. 326; Jan. 1997.
*No Spams: Online Guides to Thwarting Junk E-Mail*; PC WEEK; v13, n41, p. 149; Oct. 14, 1996.
*CyberPR Cutting The Spam Out of Your Diet With Email Filters*; Interactive PR & Marketing News; Jan. 22, 1999.
*Simple Software Commands Allow Users to Tame Unwanted Email*; PR News; Nov. 30, 1998.
*Spam Creates New Service 'No Single ISP Can Do It' Concentric Says*; ISP Business News; Jul. 27, 1998.
*Bright Light Technologies Wants to Outsource Spam Control*: electronic Mail & Messaging Systems; Jul. 24, 1998.
*No More Spams! Filters Best Defense, Experts Say*; Electronic Messaging News; Jun. 10, 1998.
*Filtering Hardware Gives ISPs an Edge*; Internet Week; Apr. 6, 1998.
*Free Spam Filter Offered on The Web*; Interactive Daily; Jan. 2, 1997.
*Taking Spam off the Menu*; Allison Connolly; Computer Weekly, Jul. 2, 1998.
*We Have Mail*; C Users Journal; Jan. 1994; v12, n1, p. 116.
*E-Mial: Next Generation Product from Beyond Inc. Adds New Dimensions of E-Mail Functionality*; EDGE: Work-Group Computing Report; v2, n37, p. 8; Feb. 4, 1991.

* cited by examiner

METHOD AND SYSTEM FOR COMPARING INFORMATION CONTENTS

BACKGROUND OF THE INVENTION

1. Field of the Invention

The invention relates to information processing. More particularly, the invention relates to a system and a family of methods that provide for fast and reliable comparison of information contents.

2. Description of Related Technology

An organization may receive thousands of emails every day. The received emails may be automatically stored in a relational database from which customer service representatives may retrieve, read, and act upon. For various reasons, some malicious, some by mistake, others due to errors in the infrastructure, a number of duplicate copies of an email may be received or stored in the relational database.

There are many problems with storing duplicate copies of an email. Storing large number, sometimes thousands, of identical email in a database severely affects the system performance, and wastes personnel time. Since the received emails are typically large in size, they are usually stored as Binary Large Objects (BLOBs). The BLOBs are not searchable for determining whether they include any duplicates, and even if they were searchable, it would be prohibitively time consuming. That is because the emails have to be stored in the relational database before being searched, and the existing search techniques are limited to the size and type of data to be searched.

There is a need, therefore, for detecting duplicate emails, before storing them in the system, in a fast and reliable way.

SUMMARY OF THE INVENTION

One presently preferred embodiment of the invention provides a system and a method for detecting whether received information content is identical to a plurality of stored information contents. The system and method may include the steps of determining a plurality of parameters, each representing one of the plurality of stored information contents, and storing the plurality of parameters. After receiving an information content, the system and method may determine a parameter representing the received information content, compare the parameter representing the received information content with the plurality of stored parameters; and indicate that the received information content is identical to a stored information content if the corresponding parameters are equal. In one embodiment, the parameters may be determined based on an order and a value of each character in the corresponding information content.

Another presently preferred embodiment of the invention provides a system and a method for comparing a plurality of information contents. The system and method may include the steps of determining a plurality of parameters, each representing one of the plurality of information contents, and comparing the plurality of parameters, such that equality between a pair of the plurality of parameters indicates that a corresponding pair of the plurality of information contents are identical.

DETAILED DESCRIPTION OF THE INVENTION

Figure 1:
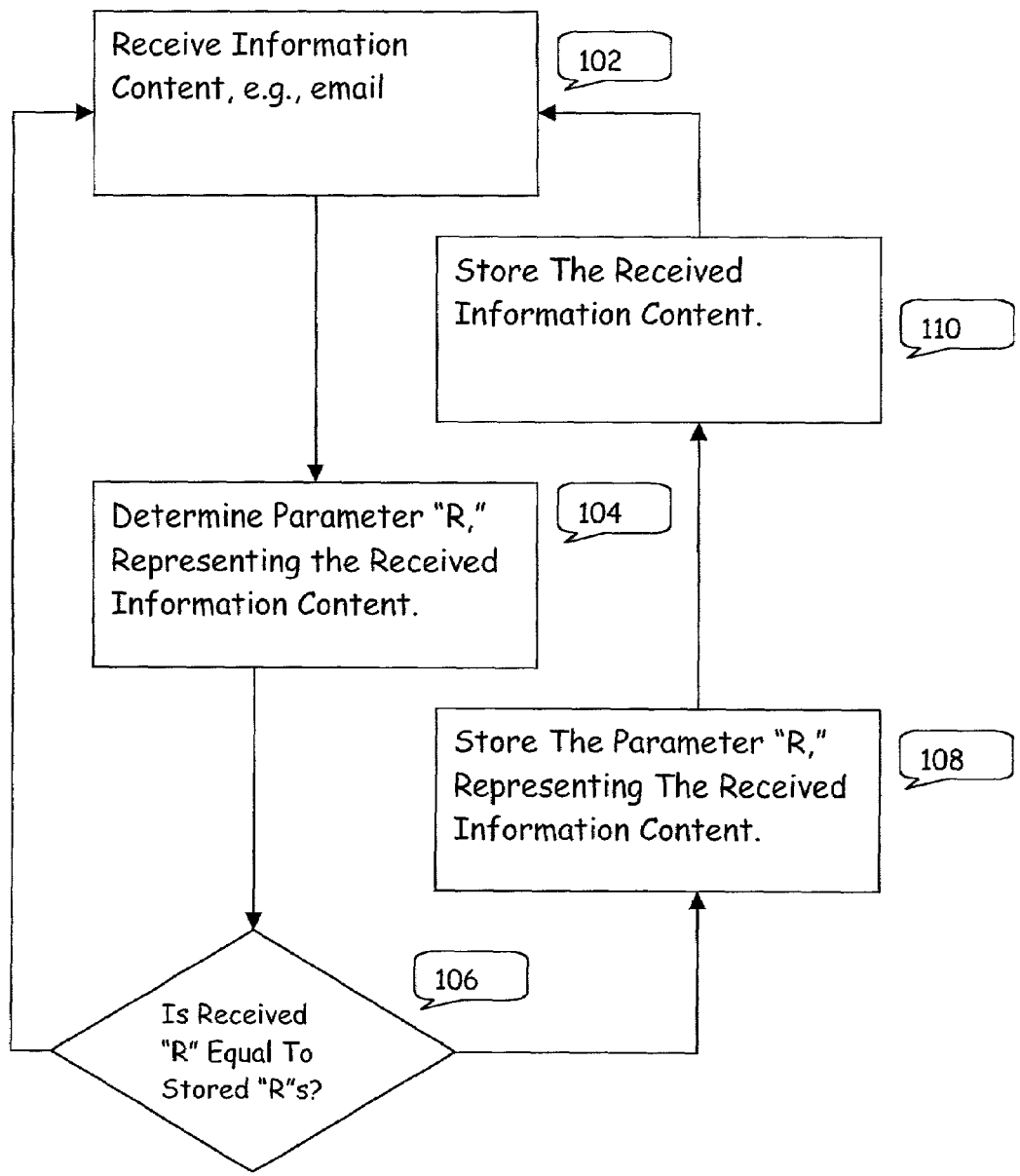
FIG. 1 shows a representation of an exemplary process for comparing information contents according to one embodiment of the invention.

One embodiment of a process for comparing information contents is represented in FIG. 1. The process may be applied to comparison of contents of any type of electronic files, databases, or data objects and constructs, including emails, Web pages, and the like. In the following, however, an exemplary discussion of the process for comparing information contents according to one embodiment of the present invention is presented in reference to emails. When an email is received by an organization's computing network, before storing the email, it is desirable to compare the content of the received email to the content of the previously received and stored emails to determine whether a duplicate copy of the received email is already stored in the system.

Since the received emails are typically large in size, they are usually stored as Binary Large Objects (BLOBs). The BLOBs are not searchable for determining whether they include any duplicates, and even if they were searchable, it would be prohibitively time consuming. That is because the emails have to be stored in the relational database before searching them, and the existing search techniques are limited to the size and type of data to be searched. According to one embodiment of the invention, a parameter that uniquely represents the content of each email may be determined for each received email, and the comparison process may be efficiently carried out on the parameters, rather than on the actual email contents. This process makes the comparison fast and reliable, and improves system performance and the personnel effectiveness.

Referring to FIG. 1, after information content, e.g. an email, is received 102, through the Internet or any global communications network, the process determines 104 a parameter that uniquely represents the content of the received email. In step 106, the parameter representing the received email is compared with the previously stored parameters representing the previously received and stored emails. In one embodiment, the parameters may be single numerical values, which may be efficiently compared together by simple comparison techniques, thereby avoiding comparison of large size email contents.

In one embodiment, the parameter representing the content of an email may be determined using the following formula:

$$R = \left| n(\Sigma n^{0.1} a^{0.1}) - (\Sigma n^{0.1})(\Sigma a^{0.1}) / SQRT\left\{ \left[ n(\Sigma (n^{0.1})^2) - \Sigma (n^{0.1})^2 \right] \left[ n(\Sigma (a^{0.1})^2) - \Sigma (a^{0.1})^2 \right] \right\} \right|$$

In the above formula, "R" stands for the parameter that uniquely represents the content of an email. The numerical value of "R" may be within zero and one. The factor "n" represents the position order of the constituent characters of the email, and the factor "a" represents a unique value for the constituent characters in the email. In one embodiment "a" may be represented by an ASCII code, but other codes may be used.

Table 1 shows some exemplary short information contents along with the corresponding unique "R" values. The "R" values shown in Table 1 are determined using ASCII values for the constituent characters of each information content, with precision of eight digits. A typical email may include up to several thousands of characters, and the corresponding "R" value may be determined with higher precision for higher accuracy.

TABLE 1

| Information Content | ASCII values | "R" value |
|---|---|---|
| aaa | 97, 97, 97 | 0.99878402 |
| aaaa | 97, 97, 97, 97 | 0.99867733 |
| aab | 97, 97, 98 | 0.99879121 |
| bbb | 98, 98, 98 | 0.99877977 |
| xxy | 120, 120, 121 | 0.99869948 |

If the result of parameter comparison in step 106 indicates that the parameter representing the received email is equal to one of the previously stored parameters, indicating that the received email is identical to one of the previously stored emails, the received email is not stored. On the other hand, if the result of parameter comparison in step 106 indicates that the parameter representing the received email is not equal to any of the previously stored parameters, indicating that the received email is not identical to any one of the previously stored emails, the received email may be stored in step 108, and the corresponding parameter may be stored in step 110.

The invention contemplates a new and unique system and a family of methods for comparing contents of information objects, such as emails, which may be implemented in a network of computer systems, interconnected by a global communications network, such as the Internet. A computer system may include user terminals, storage devices, processing units, input and output devices, and networking devices and software modules.

Figure 2:
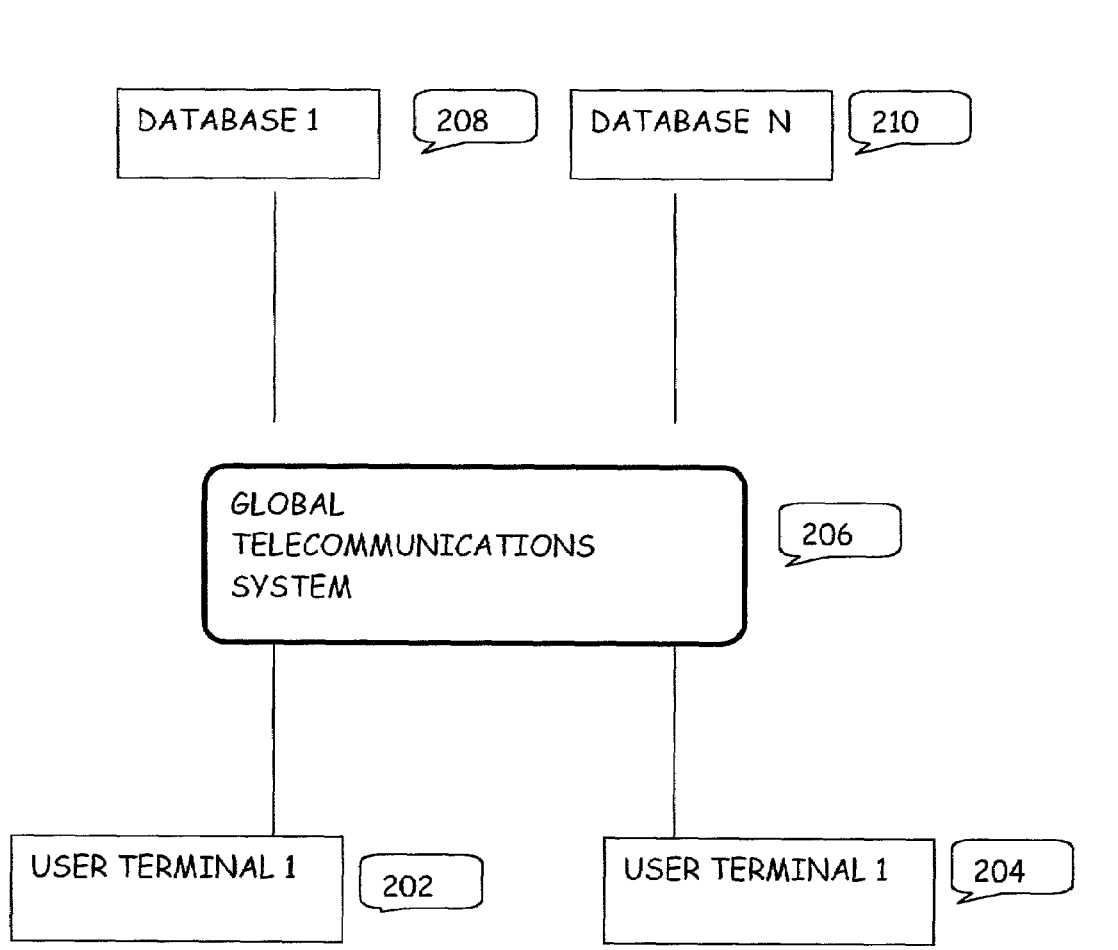
FIG. 2 shows a representation of an exemplary system for implementing the process described in FIG. 1.

FIG. 2 shows a representation of an exemplary system for implementing the different embodiments of the invention. The user terminals 202, 204 may include the hardware and software modules to implement the disclosed invention. The user terminals may also include the necessary devices and software modules to connect to the global telecommunication network 206, which may include the Internet. The information contents and the corresponding parameters may be maintained in the databases 208, 210.

The method and system disclosed herein provide for detecting duplicate information contents such as emails, before storing them in the system, in a fast and reliable way. Although the invention has been described in detail with reference to particular preferred or exemplary embodiments, persons possessing ordinary skill in the art to which this invention pertains will appreciate that various modifications and enhancements may be made without departing from the spirit and scope of the claims that follow.

The invention claimed is:

1. A computer implemented method for detecting whether a received information content is identical to any of a plurality of stored information contents, comprising the steps of:

calculating a plurality of unique parameter values by applying an algorithm that calculates, for each of a plurality of stored information contents, a unique parametric value to a predetermined precision set by an organization, wherein each unique parametric value represents one of the plurality of stored information contents;

storing the plurality at parameter values;

receiving a new information content;

responsive to receiving said new information content, applying said algorithm to said received information content to calculate a parametric value representing the received information content;

comparing the parameter value representing the received information content with each of said unique plurality of stored parameter values; and indicating that the received information content is identical to a stored information content if the corresponding parameters values are equal;

wherein said algorithm is:

$$R = |n(\Sigma n^{0.1}a^{0.1}) - (\Sigma n^{0.1})(\Sigma a^{0.1})/SQRT\{[n(\Sigma(n^{0.1})^2) - \Sigma(n^{0.1})^2][n(\Sigma(a^{0.1})^2) - \Sigma(a^{0.1})^2]\}|,$$

where "R" stands for the parameter that uniquely represents the received information content, the numerical value of "R" may be within zero and one, the factor "n" represents the position order of the constituent characters of the received information content, and the factor "a" represents a unique value for the constituent characters in the received information content.

2. The method of claim 1, wherein the plurality of information contents include electronic mails.

3. The method of claim 1, wherein the information content is received through a global communication network.

4. The method of claim 3, wherein the global communications network includes the Internet.

5. The method of claim 1, wherein each parameter is determined based on an order and a value of each character in the corresponding information content.

6. A computer implemented method for comparing a plurality of information contents, comprising the steps of:

calculating a plurality of parameter values by applying an algorithm that calculates each of a plurality of stored information contents to a predetermined precision, each parametric value representing one of the plurality of information contents;

comparing the plurality of parameter values, such that equality between a pair of the plurality of parameter values indicates that corresponding pair of the plurality of information contents is identical;

wherein said algorithm is:

$$R = |n(\Sigma n^{0.1}a^{0.1}) - (\Sigma n^{0.1})(\Sigma a^{0.1})/SQRT\{[n(\Sigma(n^{0.1})^2) - \Sigma(n^{0.1})^2][n(\Sigma(a^{0.1})^2) - \Sigma(a^{0.1})^2]\}|,$$

where "R" stands for the parameter that uniquely represents the received information content, the numerical value of "R" may be within zero and one, the factor "n" represents the position order of the constituent characters of the received information content, and the factor "a" represents a unique value for the constituent characters in the received information content.

7. The method of claim 6, wherein the plurality of information contents include electronic mails.

8. The method of claim 6, wherein each one of the plurality of parameters is determined based on an order of each character in the corresponding information content.

9. The method of claim 8, wherein each one of the plurality of parameters is determined based on a value of each character in the corresponding information content.

10. The method of claim 9, wherein the value includes ASCII value.

11. A computer readable medium embodying a computer implemented method for comparing a plurality of information contents, the computer implemented method comprising the steps of:

calculating a plurality of parameter values by applying an algorithm that calculates each of a plurality of stored information contents to a predetermined precision, each parametric value representing one of the plurality of information contents;

comparing the plurality of parameter values, such that equality between a pair of the plurality of parameter values indicates that corresponding pair of the plurality of information contents is identical;

wherein said algorithm is:

$$R = |n(\Sigma n^{0.1} a^{0.1}) - (\Sigma n^{0.1})(\Sigma a^{0.1}) / SQRT\{[n(\Sigma(n^{0.1})^2) - \Sigma(n^{0.1})^2][n(\Sigma(a^{0.1})^2) - \Sigma(a^{0.1})^2]\}|,$$

where "R" stands for the parameter that uniquely represents the received information content, the numerical value of "R" may be within zero and one, the factor "n" represents the position order of the constituent characters of the received information content, and the factor "a" represents a unique value for the constituent characters in the received information content.

12. A system for comparing a plurality of information contents, comprising:

at least one user terminal;

means for calculating a plurality of parameter values by applying an algorithm that calculates each of a plurality of stored information contents to a predetermined precision, each parametric value representing one of the plurality of information contents;

means for comparing the plurality of parameter values, such that equality between a pair of the plurality of parameter values indicates that corresponding pair of the plurality of information contents is identical; and at least one database containing the plurality of information contents and the plurality of parameters;

wherein said algorithm is:

$$R = |n(\Sigma n^{0.1} a^{0.1}) - (\Sigma n^{0.1})(\Sigma a^{0.1}) / SQRT\{[n(\Sigma(n^{0.1})^2) - \Sigma(n^{0.1})^2][n(\Sigma(a^{0.1})^2) - \Sigma(a^{0.1})^2]\}|,$$

where "R" stands for the parameter that uniquely represents the received information content, the numerical value of "R" may be within zero and one, the factor "n" represents the position order of the constituent characters of the received information content, and the factor "a" represents a unique value for the constituent characters in the received information content.

13. The computer system of claim 12, further implemented on a global telecommunications network.

14. The computer system of claim 13, wherein the global telecommunications network includes the Internet.

\* \* \* \* \*